Oct. 6, 1959   J. R. PALMER   2,907,109
CHEESE FORMING APPARATUS
Filed Feb. 13, 1956   5 Sheets-Sheet 1

INVENTOR.
JOHN RICHARD PALMER
BY
ATTORNEY

45° TO 90°

INVENTOR.
JOHN RICHARD PALMER
BY
ATTORNEY

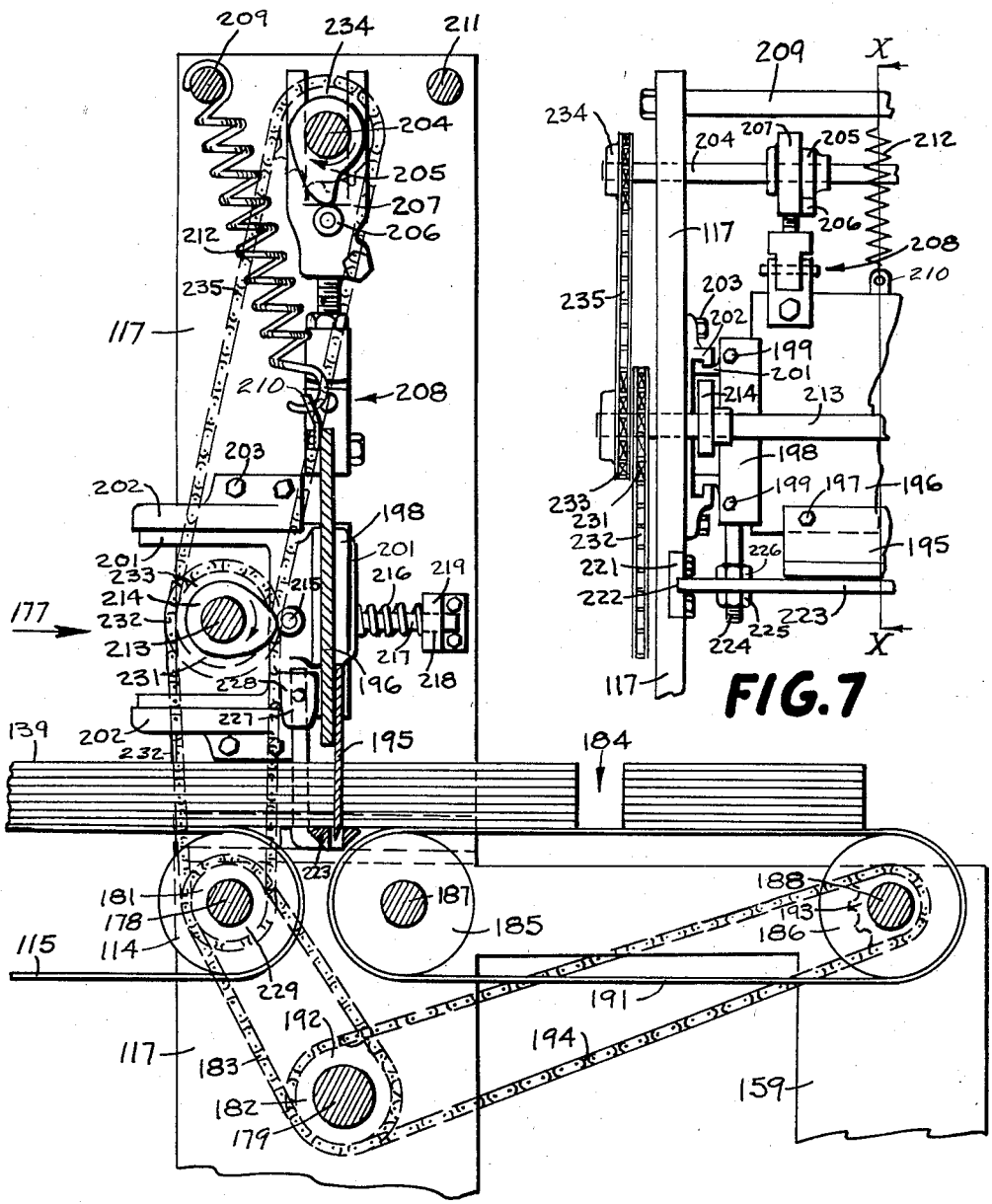

Oct. 6, 1959 J. R. PALMER 2,907,109
CHEESE FORMING APPARATUS
Filed Feb. 13, 1956 5 Sheets-Sheet 4

INVENTOR.
JOHN RICHARD PALMER
BY
ATTORNEY

0° TO 45°

INVENTOR.
JOHN RICHARD PALMER
BY S. E. Sinish
ATTORNEY

United States Patent Office 2,907,109
Patented Oct. 6, 1959

2,907,109

CHEESE FORMING APPARATUS

John Richard Palmer, De Pere, Wis.

Application February 13, 1956, Serial No. 565,007

3 Claims. (Cl. 31—14)

This invention relates generally to improvements in cheese forming apparatus and more particularly to a method and apparatus for producing cheese in a thin sheet form suitable for sandwich making and packaging in multi-layer form.

The purpose of this invention is to provide a new and improved type of cheese sheet casting equipment which will particularly eliminate the "hot spot" deficiency attending the prior drum type casting equipment; to avoid being restricted to a 90° relation of the cheese ribbon stacking conveyor to the sheet casting equipment; to improve the inefficient, prior art, cheese stack cutting stage; and to avoid the prior art construction wherein a cheese sheet is formed by being pressed or rolled out between two rollers.

An object of this invention is the provision of flat belt means for the cooling of a cheese sheet formed thereon.

Another object is to provide a cooled continuous belt conveyor means for the casting of a cheese sheet thereon.

Yet another object of this invention is the provision of an arrangement of belted conveyors whereby a cheese sheet transferred from one conveyor to another results in an inversing of the sheet.

Still another object is to provide a cheese sheet casting apparatus wherein both sides of a cheese sheet are quick chilled, and held chilled for a comparatively long period of time.

A further object of this invention is the provision of cheese ribbon stacking means relatable from 0° to 90° to the cheese casting equipment.

Still a further object is to provide movable cheese stack cutting means that will cut the moving cheese stack into sections of predetermined length, said sections having sheer vertical-cut ends.

Yet a further object of this invention is to provide means for simply flowing a cheese sheet onto a cooperating supporting surface.

Another object of this invention is the provision of a nozzle and cooperating endless belt for forming a cheese sheet.

Yet another object is to provide an apparatus for producing cheese in sheet form whereby efficiency and economy in production are promoted, and a more commercially acceptable product obtained.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein;

Fig. 1c is a half section view of the guillotine cutter. In view of the fact that the whole cutter structure is symmetrical about its vertical axis, only one side thereof is shown and described, it being understood that identical structure makes up the remaining side;

Fig. 7 is a rear elevation view of Fig. 1c.

Figure 1A:
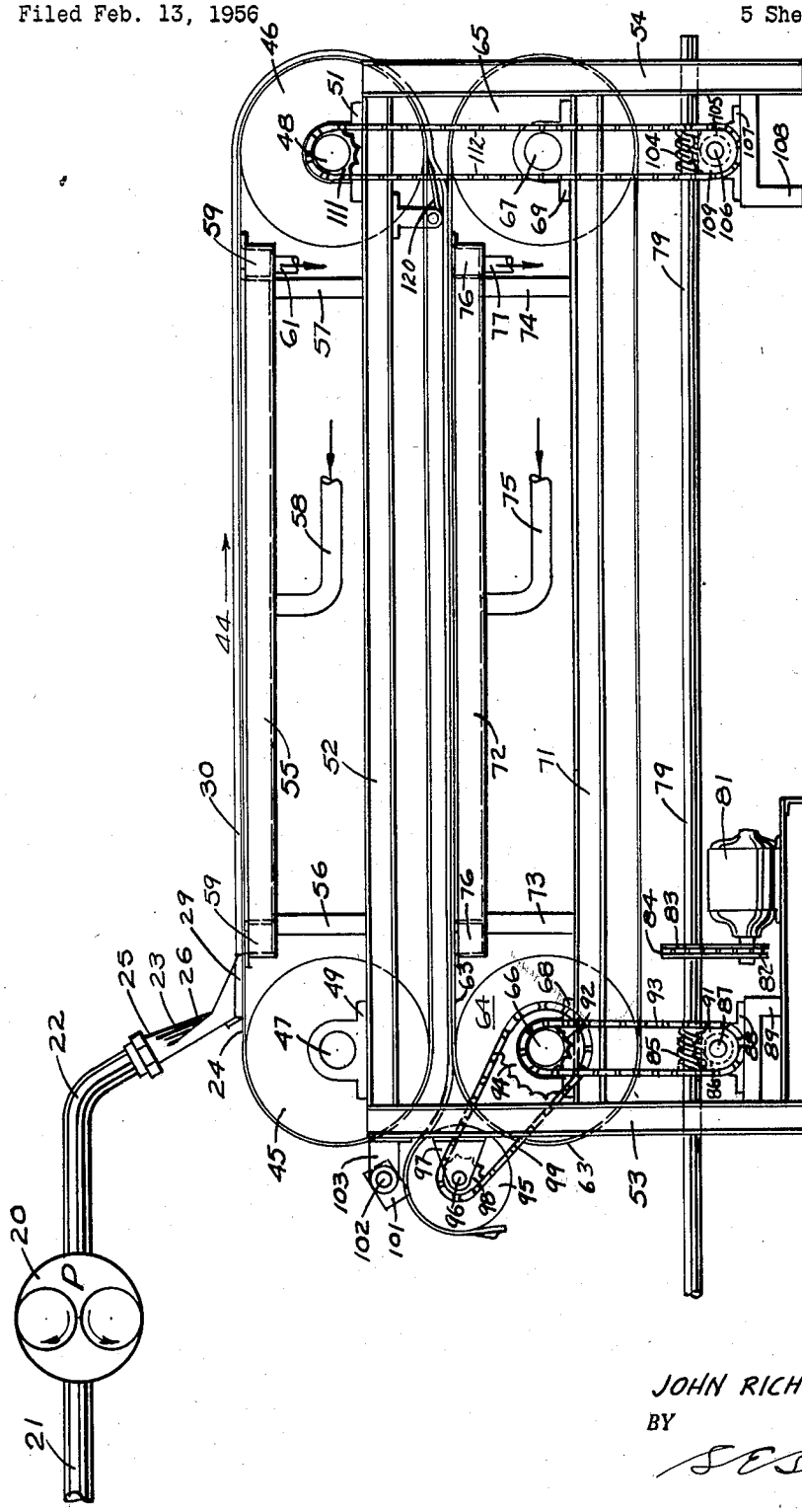
Fig. 1a illustrates a side elevation view of a preferred embodiment of the invention, showing the first or sheet casting part of a cheese forming machine, too large to be shown in its entirety on one drawing sheet, and therefore broken and extended over three drawing sheets.
Figure 2:
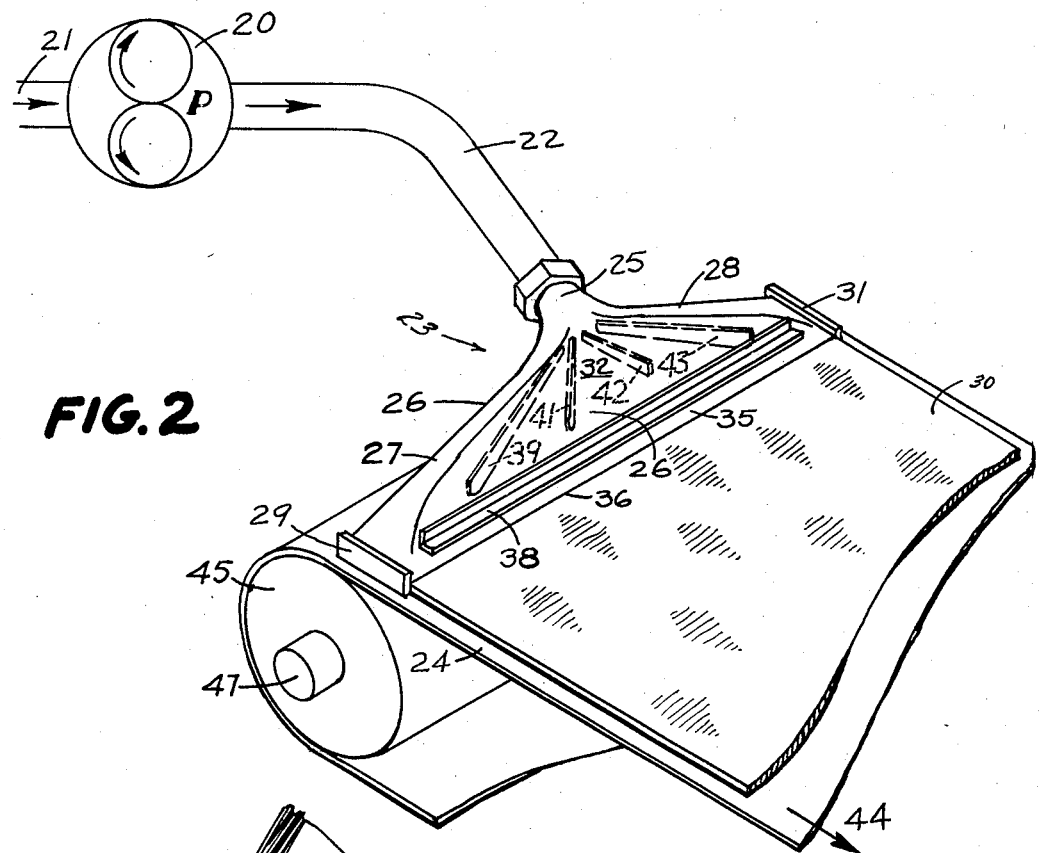
Fig. 2 shows an enlarged perspective view of the nozzle and cooperating belt portion of Fig. 1.
Figure 3:
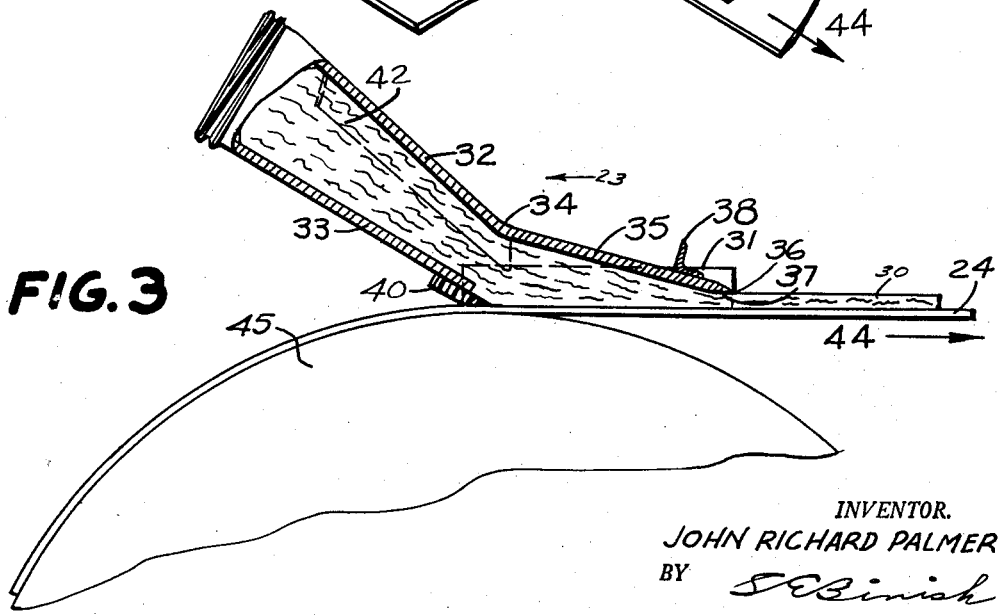
Fig. 3 is a longitudinal section view through the apparatus shown in Fig. 2.

Referring now to the drawings, wherein like reference characters designate like or corresponding parts throughout the several views, there is shown in Figs. 1a, 2 and 3, a gear pump 20, or the like, receiving fluid, plastic, or molten cheese through inlet tube 21 communicating with a source of molten cheese not shown. An outlet tube 22, communicating with the gear pump 20 and nozzle generally indicated at 23, delivers the soft cheese to said nozzle for discharge onto a conveyor, such as a continuous, stainless steel, belt conveyor 24, or the like, in the form of a thin sheet or ribbon 30. The thickness and width of the sheet may be varied as desired. However one practical dimensioned sheet would be about twenty-six inches wide and about one-eighth inch thick. A practical dimensioned ribbon would be about three and three-quarters inches wide and one-eighth inch thick.

The nozzle 23, best shown in Figs. 2 and 3, is disposed tilted or downwardly inclined, adjacent to or against the belt 24, so as to deliver cheese onto the belt conveyor 24. The nozzle comprises a tubular neck section 25 and a suddenly enlarged streamlined body section 26. Narrow divergent sides 27 and 28 thereof terminate in longitudinal edge elements 29 and 31, respectively. Top plate 32 and bottom plate 33 converge to form a contracted throat section at 34; and top plate 32 is extended therebeyond to form a divergent and projecting guide lip 35. The leading edge of the guide lip is sharpened to form a 60° knife edge 36, the plane of the underside of the sharpened portion 37 being preferred to be disposed parallel to the plane of the belt conveyor 24. The angular knife edge relief permits a ready release of the cheese from the nozzle lip, and results in a smooth flow away from the nozzle without undesirable roughness of the cheese caused by adhesion of the cheese to the nozzle lip.

To provide the broad span of the guide lip with the necessary rigidity, a stiffener angle iron 38 is welded thereacross.

Radially disposed baffle ribs 39, 41, 42 and 43 are welded to the underside of top plate 26 to distribute the flowing cheese uniformly across the nozzle outlet.

The nozzle and belt conveyor cooperate to form means for forming a sheet of cheese on said belt conveyor. The side edge elements 29 and 31 are disposed to slidably engage the top surface of the belt and thereby determine the width and edges of the cheese sheet to be formed. The bottom plate 33 provided with a nylon edge element 40 slidably engages the top surface of the belt conveyor to prevent the fluid cheese from escaping rearwardly. The leading edge 36 of the guide lip 35 is preferably spaced about one-eighth inch above the belt thereby providing an opening or outlet for the fluid cheese. It will be noted that the belt 24, side edge elements 29 and 31, and the knife edge 36 cooperate to define an outlet through which means the cheese flows and the cheese sheet is formed.

In actual operation the belt is moving in the direction of arrow 44 and tends to draw the cheese out of the confining side elements and overhead knife edge 36.

The fluid cheese flows out of the nozzle at its full opening capacity, and at a rate equal to the speed of the belt 24.

It is obvious that in lieu of a flat belt surface, a curved surface conveyor, such as on a drum, could likewise be used against which the nozzle could be disposed to define an outlet therewith for forming a cheese sheet on said surface.

The endless belt conveyor 24 shown in Fig. 1a is trained over a pair of spaced rotatable drums 45 and 46 having shafts 47 and 48 journalled in suitable bearings such as indicated at 49 and 51, respectively. Said bearings are mounted on a suitable horizontal framework embodying I-beam members, such as indicated at 52, supported by suitable leg members such as indicated at 53 and 54.

A cooling pan 55, containing a coolant, such as brine or the like, is supported under the upper run of belt 24 by means of suitable leg members, such as indicated at 56 and 57, mounted on I-beam members 52. Said pan is provided with a communicating coolant inlet tube 58.

Around the perimeter of the pan 55, and attached thereto, is provided an overflow trough 59 discharging through communicating tube 61. Said trough 59 receives circulating coolant as it overflows the top of pan 55.

The inlet and outlet tubes 58 and 61, respectively, are adapted to be connected with refrigerating equipment which will serve to cause a suitable refrigerant or coolant to circulate into pan 55, then overflow its upstanding edges, and into overflow trough 59, and thence back to said refrigerating equipment.

The upper run of the conveyor belt 24 intermediate the drums 45 and 46 is slidably supportable on the upstanding edges of the pan 55. As the circulating refrigerant overflows the top of the pan 55, it contacts the underside of the belt 24, and thereby cools the belt and also the cheese sheet formed thereon. In operation, the belt in effect floats on the overflowing coolant.

Obviously, wiping means engaging the underside of the belt and located in that end portion of trough 59 at the discharge tube 61, may be used to insure the removal of excess coolant clinging to the belt, should that be necessary.

A second arrangement of belt conveyor and cooling means, as described herebelow, are located under the belt conveyor 24 and cooling means described above.

Said second arrangement comprises an endless conveyor belt 63 trained over a pair of spaced rotatable drums 64 and 65 having shafts 66 and 67 journalled in suitable bearings such as indicated at 68 and 69, respectively. Said bearings are mounted on a suitable horizontal framework embodying I-beam members, such as indicated at 71, supported by the suitable leg members such as indicated at 53 and 54.

A cooling pan 72, containing a coolant such as brine or the like, is supported under the upper run of belt 63 by means of suitable leg members, such as indicated at 73 and 74, mounted on I-beam members 71. Said pan 72 is provided with a communicating coolant inlet tube 75, centrally located on the pan.

Around the perimeter of the pan 72, and attached thereto, is provided an overflow trough 76 discharging through communicating tube 77. Said trough 76 receives circulating coolant as it overflows the top of pan 72.

The inlet and outlet tubes 75 and 77, respectively are adapted to be connected with refrigerating equipment which will serve to cause a suitable refrigerant or coolant to circulate into pan 72, then overflow therefrom and into trough 76, and thence back to said refrigerating equipment. This refrigerating equipment may be the same equipment mentioned above, or separate therefrom.

The upper run of belt conveyor 63 intermediate the drums 64 and 65 is slidably supportable on the upstanding edges of the pan 72. As the circulating refrigerant overflows the upstanding edges of the pan 72 it contacts the underside of the belt 63 and thereby cools the belt and consequently the cheese sheet formed thereon.

Obviously, wiping means engaging the underside of the belt and located in that end portion of the trough at the discharge tube 77, may be used to insure the removal of excess coolant clinging to the belt, should that be necessary.

Driving means for drum 64 is provided as follows. A line shaft 79 is journalled on spaced legs 53 and 54. A motor 81 having a sprocket wheel 82 mounted rotatively-rigid on the motor shaft is aligned with a sprocket wheel 83 mounted rotatively-rigid on main shaft 79. Said motor drives said main shaft through means of a chain 84 engaging said sprocket wheels 82 and 83.

A worm gear comprising a worm 85 mounted rotatively rigid on main shaft 79 and an engaged worm wheel 86 provides a speed reduction means. The worm wheel 86 is mounted rotatively-rigid on a shaft 87 journalled in bearing 88 supported on frame 89. A sprocket wheel 91 is likewise mounted rotatively-rigid on said shaft 87.

A sprocket wheel 92, aligned with sprocket wheel 91, is mounted rotatively-rigid on shaft 66. Said sprocket wheels 91 and 92 are connected by means of an engaging chain 93 for driving drum 64.

A second sprocket wheel 94 is mounted rotatively-rigid on shaft 66 to drive cheese sheet slitting means described as follows. Drum 95, disposed parallel to drum 64 and slightly thereabove, and mounted rotatively-rigid on shaft 96, is journalled in suitable bearings such as indicated at 97.

A sprocket wheel 98, mounted rotatively-rigid on shaft 96 and aligned with sprocket wheel 94, is connected to said sprocket wheel 94 through means of engaging chain 99.

A plurality of uniformly spaced slitting knives 101 are mounted rotatively-rigid on a shaft 102 fixed in suitable brackets such as indicated at 103. Said brackets are mounted on the leg members such as indicated at 53. The slitters 101, mounted to prevent such slitters from bearing on the drum 95 with a cutting pressure, will cut through and slit a sheet of cheese carried on drum 95 into a plurality of parallel ribbons or strips of predetermined width.

Drum 46 is driven by the following means. A second worm gear comprising a worm 104, mounted rotatively-rigid on line shaft 79, and an engaged worm wheel 105 provides a speed reduction means. The worm wheel 105 is mounted rotatively-rigid on a shaft 106 journalled in bearing 107 supported on frame 108. A sprocket wheel 109 is likewise mounted rotatively-rigid on said shaft 106.

A sprocket wheel 111, aligned with sprocket wheel 109, is mounted rotatively-rigid on shaft 48. Said sprocket wheels 109 and 111 are connected by means of an engaging chain 112 for driving said drum 46.

Drums 64 and 46 are driven at the same surface speed, but in opposite directions; so that the upper runs of belts 24 and 63 will travel at the same speeds but in opposite directions.

Drum 95 is also driven at the same surface speed as drums 64 and 46.

Suitable scraper or doctor blades such as indicated at 120, for engaging the surface of the conveyor belt 24, at drum 46, may be provided to insure stripping of the cheese from said drum 46, and to direct the sheet uniformly to the top run of underlying belt 63. Uniformity of stripping is necessary to avoid stretching and misshaping of the sheets; at this point the cheese sheet is only partly cooled and has not set up sufficiently to permit an undirected and unaided transfer.

Figure 1B:
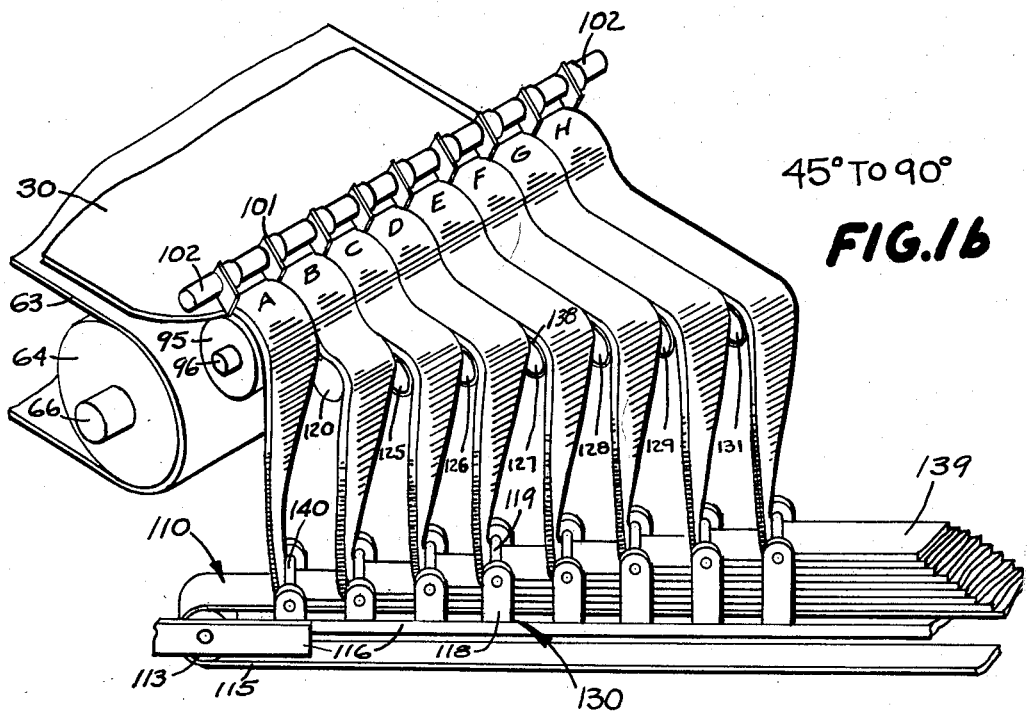
Fig. 1b is a perspective view of the stacking or cheese ribbon superposing part of the apparatus.

From the slitters, the ribbons of cheese are directed downwardly and respectively into an arrangement of guides, Fig. 1b, which serves to twist each ribbon and to guide each ribbon into a predetermined superposed relation on a transfer conveyor generally indicated at 110, for any other desired operations.

The conveyor 110 can be disposed at any angular relation, ranging from 0° to 90°, relative to the sheet forming or casting equipment disclosed in Fig. 1a. That is, the transfer conveyor can be aligned straight ahead or longitudinally (0° angle) with the casting equipment; or it can be related through varying degrees up to and including 90° therewith as shown in the two arrangements of Fig. 1b and Fig. 5.

Figure 4:
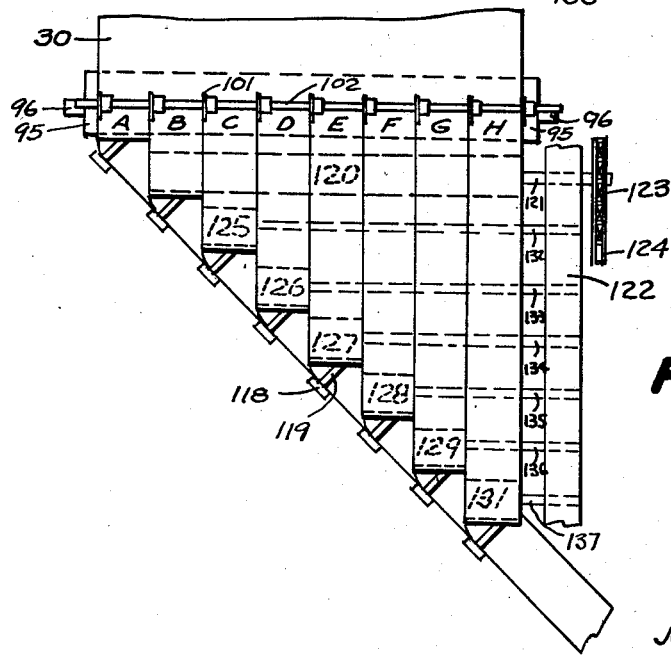
Fig. 4 is a plan view of the apparatus shown in Fig. 1b.

Fig. 1b and Fig. 4 show a perspective and plan view, respectively, of the stacking or superposing conveyors, and wherein the transfer conveyor 110 is disposed at an angle of 45° relative to the sheet casting equipment. It is obvious that the transfer conveyor and associated guides can be conveniently disposed at any angular relation desired, ranging from 45° to 90°, relative to the sheet casting equipment, by merely positioning the conveyor accordingly. In this event the position of the stacking conveyors, intervening between the slitter means and the transfer conveyor 110, must be adjusted in accordance therewith.

The transfer conveyor 110 comprises spaced rotatable rolls 113 and 114, see Figs. 1b and 1c, respectively, over which is trained an endless stainless steel belt 115, roll 113 being journalled in a suitable supporting frame part such as indicated at 116, and roll 114 being journalled in a suitable frame part such as indicated at 117, Fig. 1c.

The upper run of said belt 115, intermediate the rolls 113 and 114, is preferably supported by means of a suitable flat plate-like frame part such as indicated at 116.

Mounted on said plate 116 on opposite sides of belt 115 are a plurality of oppositely disposed paired arm guides 118, spaced to receive the cut cheese ribbons, therebetween. Said guides are provided with horizontally disposed twisting rolls 119 journalled in the top end portions of guide arms 118. Said twisting guide assemblies of paired guide arms and roller serve to twist each ribbon through an angle consistent with the disposition of the transfer conveyor. The cheese ribbons pass under the respective rolls 119 and are delivered in stacked relation onto conveyor belt 115 which carries the stacked or superposed cheese ribbons forwardly for the cutting operation to be hereinafter described.

Interposed between the transfer conveyor belt 115 and the slitter drum 95 are a plurality of stacking conveyors for conveying the ribbons from the slitter to the transfer conveyor belt 115 and superposing the ribbons thereon. Said means are disposed in elevation between the slitter drum and the transfer conveyor belt, the midpoint preferred when practicable.

Said stacking conveyors comprise a common elongated drum, belt engaged with a plurality of individual pulleys. The elongated drum 120 is disposed parallel to and below the slitter drum 95. Said drum is mounted rotatively-rigid on a shaft 121 journalled in any suitable supporting frame part such as indicated at 122. A sprocket 123 is mounted rotatively-rigid on said shaft 121 and is driven by a chain 124 connected to the driving line shaft 79 thru the usual sprocket means.

In the same horizontal plane with said drum 120 are disposed a plurality of pulleys 125, 126, 127, 128, 129 and 131, rotatably mounted on shafts 132, 133, 134, 135, 136 and 137, respectively, fixed in frame member 122.

Endless conveying belts, such as indicated at 138, Fig. 1b, trained over pulley 125, are trained over the remaining pulleys and over the common elongated drum 120, thereby forming individual stacking belt conveyors, driven by the common drum 120.

Said individual stacking conveyors are disposed and adapted to deliver cheese ribbons substantially directly over their associated twisting guide assembly, such as indicated by conveyor pulley 126 and twisting guide means 130.

The outer end of elongated drum 120 is not associated with any belt or pulley. Over this portion of said pulley, the cheese ribbon B courses directly thereover, and vertically downward to its associated twisting guide.

Cheese ribbon A courses over slitter drum 95, and then directly downward to its associated twisting guide. The drum 120 does not extend to this ribbon.

The remaining cheese ribbons B through H, inclusive, are carried by the above described individual stacking belt conveyors to a point directly over their associated twisting guide means, and thence downwardly and through said twisting guide means for stacking on conveyor belt 115.

Cheese ribbon A is superimposed directly on transfer conveyor belt 115, and all the remaining ribbons B through H, inclusive, are successively superposed on each other, resulting in a stacked arrangement of cheese ribbons such as indicated at 139.

To vary the angular relation of the receiving stacking belt 115 with relation to the cheese sheet, anywhere between 45° and 90°, one merely pivots the transfer conveyor about a fixed vertical axis through the center of the first twisting guide 140, swinging the outer end of the conveyor toward the slitters. Obviously, the individual stacking belt conveyors must be shortened and the twisting guides 130 must be somewhat rearwardly disposed to accommodate the new angular positionment so that the ends of the individual conveyors are disposed directly over their associated twisting guides, respectively.

Figure 5:
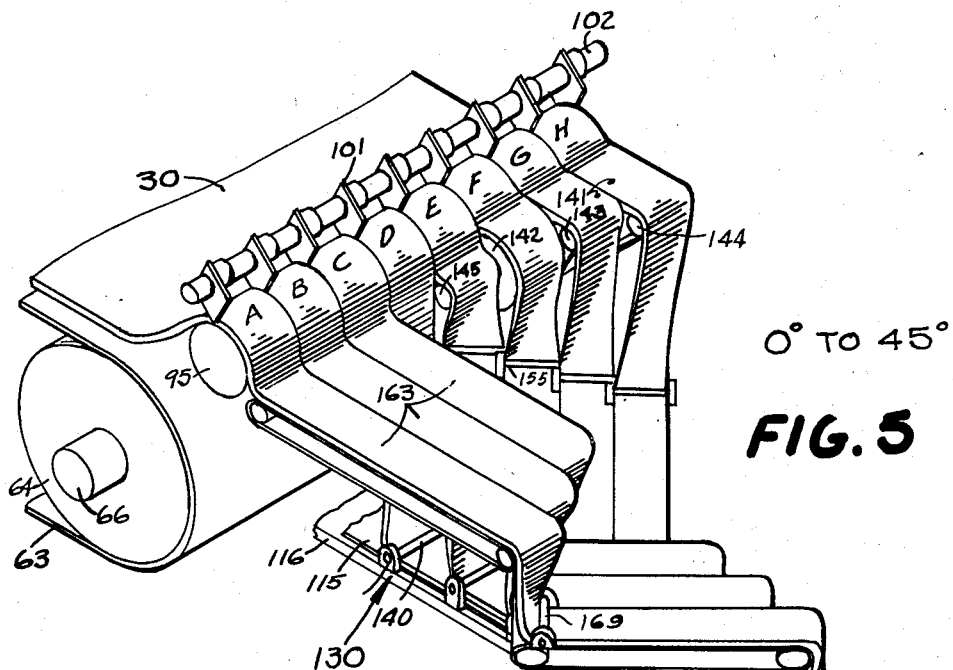
Fig. 5 is a modification of the stacking means shown in Fig. 1b.
Figure 6:
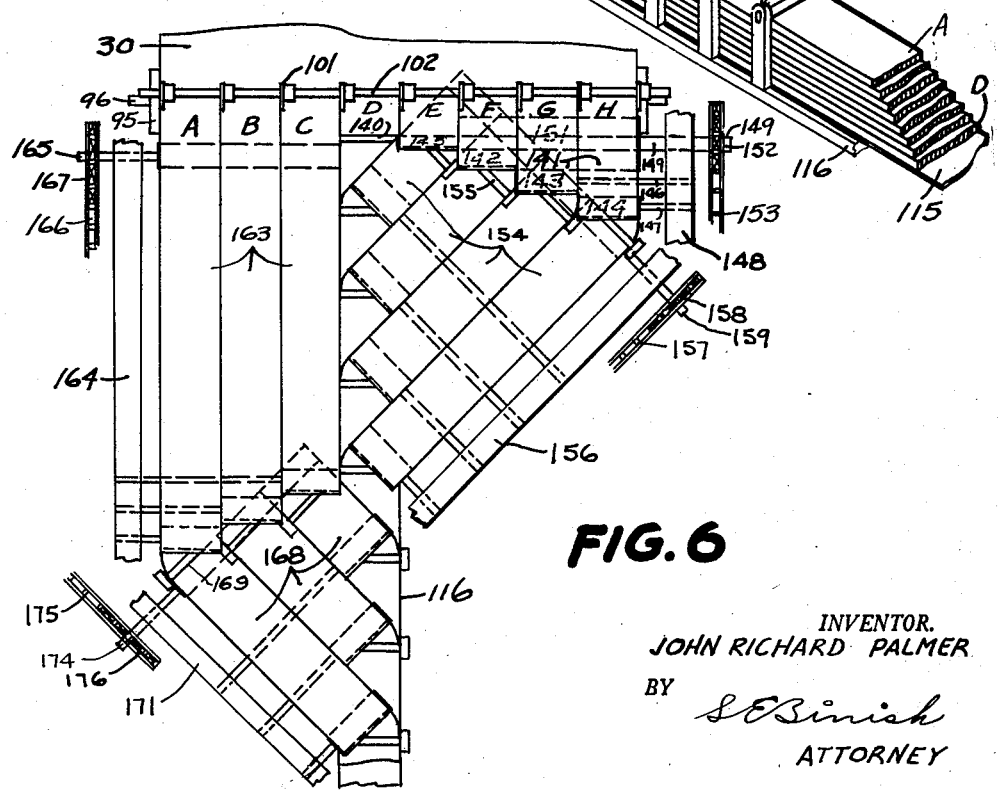
Fig. 6 is a plan view of Fig. 5.

Figs. 5 and 6 show a perspective and plan view, respectively, of stacking conveyors adapted to serve any disposition, of the transfer conveyor, from 0° to 45°, relative to the longitudinal axis of the cheese sheet. In this particular disclosure the transfer conveyor belt 115 is aligned straight ahead or longitudinally (0° angle) with the casting equipment and cheese sheet thereon. This arrangement is suitable for a dispositionment of the transfer conveyor, relative to the cheese sheet casting equipment, in any angular relationship varying from 0° to 45°, by merely pivoting the transfer conveyor about a fixed vertical axis through the center of the twisting guide 140 and adjusting the plurality of individual stacking conveyors and twisting guides in accordance therewith.

In conjunction with this disposition of the transfer conveyor, there is disposed between the transfer conveyor belt 115 and the slitter drum 95, a plurality of cascade related stacking conveyors for conveying the cheese ribbons from the slitter to the transfer conveyor belt. Said cascaded conveyors are disposed in elevation between the slitter drum and the transfer conveyor belt, the mid-point preferred when practicable.

In the particular 0° disposition, as shown in Figs. 5 and 6, the ribbon D courses over slitter drum 95, and then drops directly downward to its associated twisting guide 130, and thence onto transfer belt 115. All other ribbons are directed to spaced points above said ribbon D and superposed over each other in a predetermined sequence, to be hereinafter described.

Ribbons G and H drop onto a first set of individual stacking conveyors, directed straight ahead, such as indicated at 141. Said conveyors have outer pulleys 143 and 144 rotatably mounted on shafts 146 and 147, respectively, fixed in a suitable supporting frame part such as indicated at 148. An elongated drum 151, journalled in said frame 148 through means of shaft 149, provides a common driving means for said conveyors, driven by a sprocket 152 and chain 153. Said chain 153 is driven by the driving line shaft 79 through the usual sprocket means, or the like.

The outer reduced diameter end portion 145 of drum 151 is not associated with any belt conveyor means. But over this portion the cheese ribbon E is conveyed directly thereover and vertically downward to an associated twisting guide 130.

Ribbon F is conveyed directly over the full diameter end portion 142 of drum 151.

A second set of individual stacking conveyors 154 is disposed at an angle of 45° to said first set of conveyors 141. Said second set of conveyors 154 has its rearward end disposed under the forward end of the first conveyor set 141; and its progressively foreshortened forward end is disposed over the transfer belt 115. Twisting guide means, such as indicated at 155, are provided to twist the ribbons E, F, G and H inwardly 45° at the first cascade stage and to guide them onto said second set of individual conveyors 154, respectively. The plurality of twisting guide means 130 on the supporting frame 116 twist and guide the ribbons E, F, G, and H, outwardly 45°, and onto stacking belt 115, superposed over cheese ribbon D, and over each other, respectively. Said second set of individual conveyors 154 are supported in a suitable supporting frame part 156, and are chain 157 and sprocket 158 connected to common drive shaft 159, and driven by line shaft 179 through conventional sprocket connection means.

Ribbons A, B and C drop onto a third set of individual belt conveyors, directed straight ahead, such as indicated at 163. Said third set conveyor means are constructed and arranged similar to the second individual belt conveyor means 154, and supported by frame part 164. The common drive shaft 165 is chain 166 and sprocket 167 connected to line shaft 79.

A fourth set of individual stacking conveyors 168 is disposed at an angle of 45° to said third conveyor set 163. Said fourth conveyor set 168 has its rearward end disposed under the forward end of the third conveyor set 163; and its progressively foreshortened forward end is disposed over the stacking belt 115. Twisting guide means, such as indicated at 169, are provided to twist the ribbons A, B and C inwardly 45° at a cascade stage and to guide them onto said fourth set of individual conveyor means 168, respectively. The plurality of twisting guide means 130 on the supporting frame 116 twist and guide the ribbons A, B and C, outwardly 45°, and onto the transfer belt 115, superposed over cheese ribbon H, and over each other, respectively. Said fourth set of individual conveyors are constructed and arranged similar to conveyor means 154, and supported by frame part 171. The common drive shaft 174 is chain 175 and sprocket 176 connected to line shaft 79.

The transfer conveyor 110, and the first, second, third and fourth stacking conveyor sets 141, 154, 163 and 168, respectively, are driven at the same surface speed as the slitter drum 95.

The transfer conveyor belt 115 carries the stacked cheese ribbons to the guillotine cutter, generally indicated at 177, Fig. 1c, for a cross cutting operation to sever the stack into sections of predetermined length.

The driving means for the transfer conveyor belt 115 comprise a roll 114 mounted rotatively-rigid on a shaft 178 which in turn is journalled in frame part 117.

A companion shaft 179, journalled in frame 117 and driven by line shaft 79, drives shaft 178 through means of a pair of sprockets 181 and 182 mounted rotatively-rigid on said shafts 178 and 179, respectively, and a chain 183 trained thereover.

A separating conveyor, generally indicated at 184, aligned with transfer conveyor belt 115, and adapted to travel at a speed somewhat greater than said belt 115, is provided to receive the stacked and cut cheese sections from said guillotine cutter 177, and to separate and otherwise space said cheese sections on the more rapidly moving conveyor 184 belt, and to convey said spaced cheese sections to any suitable wrapping stations or apparatus.

Said separating 184 comprises a pair of spaced rolls 185 and 186 mounted rotatively-rigid on shafts 187 and 188 journalled in suitable frame parts 117 and 159, respectively. A stainless steel conveyor belt 191 is trained over said rolls 185 and 186.

Shaft 179, driven by line shaft 79, drives shaft 188 through means of a pair of sprockets 192 and 193 mounted rotatively-rigid on shafts 179 and 188, respectively, and a chain 194 trained thereover.

The guillotine cutter 177 provides means for cross cutting the stacked ribbons into sections, while the stack is moving, and presenting a sheer vertical cut edge.

To accomplish the above said function, there is provided a knife blade that is actuated downwardly and horizontally at the same time, the horizontal movement being identical with the forward speed of the stacked ribbons passing through the cutter mechanism.

Fig. 7 is a rear elevation of the guillotine cutter, showing the left half thereof, only. In view of the fact that the whole cutter is symmetrical about its vertical axis, only the structure on one side thereof will be described, it being understood that identical structure makes up the right side thereof.

Fig. 1c is a section view taken along the line X—X of Fig. 7.

Generally, the guillotine cutter might be described as a knife blade carried by a compound-crosshead mechanism, in the sense that the mechanism is produced by the union of two simple crossheads in which the guideway of one forms the slidable block of the other.

The knife blade 195 is disposed across the width of the stacked cheese ribbons and is removably attached to the vertically-movable slidable block or plate 196 by means of set screws 197. Said slidable plate is slidably engaged in vertical guideways 198 which are mounted, by means of set screws 199, on horizontally-movable slidable block 201. Said slidable block 201 is slidably engaged in horizontal guideways 202 which are mounted, by means of set screws 203, on frame member 117.

Journalled in frame 117, above the slidable plate 196, is a cam shaft 204, having mounted rotatively-rigid thereon a cam 205. Said cam engages a cam follower 206 rotatably mounted on bifurcated slideway 207. The bifurcated slideway straddles and otherwise receives cam shaft 204 between its two branches and is slidably engaged therewith.

Said bifurcated slideway 207 is pivotly connected to the vertically-movable slidable plate 196 through means of a knuckle joint construction generally indicated at 208, to allow for the horizontal movement of the plate relative to the cam shaft 204.

A pair of spacer rods 209 and 211 tie the symmetrically disposed corresponding frame members 117 in suitable spaced relation.

A tension spring 212, having its lower end hookedly engaged to an ear 210 welded on the vertically-movable slidable plate 196, and its upper end hookedly engaged on tie rod 209, is normally tensioned to urge and bias the cam follower 206 against the cam 205.

A second cam shaft 213, having a cam 214 mounted rotatively-rigid thereon, is journalled in frame 117, and disposed to actuate the horizontally-movable slidable block 201 through means of cam follower 215 rotatably mounted on said slidable block 201.

A compression spring 216 is normally compressed to urge and bias the cam follower 215 against the cam 214. Said spring 216 is carried on projecting rod 217 which has one end welded to the slidable block 201, and the other slidably reciprocable in an aperture 218 in fixed bracket 219. The spring 216, surrounding the rod 217, abuts against fixed bracket 219 and shoulders against the slidable block 201.

A removably mounted and hardened block element 221, having a horizontally disposed groove guideway 222 therein, is mounted on frame member 117 to slidably support resisting shear plate 223 therein. In view of the fact that the knife 195 has a horizontal component of motion, it follows that the motion of the coacting shear edge 223 must be synchronized therewith. To accomplish this, the shear plate is connected to a suitable horizontally-movable member, such as the vertical guideway 198 which is mounted on the horizontally-movable slidable block 201, as follows. A vertically disposed, threaded rod 224 is adjustably mounted on the shear plate 223 by means of a rod-receiving aperture in said shear plate and oppositely disposed nuts 225 and 226 locked against said plate. The other end portion of said rod 224 is received in an aperture 227 bored in bracket 228 fixed to vertical guideway 198 by any means. From the above construction it will be seen that as the knife 195 is moved forwardly the shear edge 223 is actuated synchronously therealong through means of connecting rod 224.

Cam shaft 213 is driven through means of sprockets 229 and 231 mounted rotatively-rigid on shafts 178 and 213, respectively, and a chain 232 trained thereover.

Cam shaft 204 is driven through means of sprockets 233 and 234 mounted rotatively-rigid on shafts 213 and 204, respectively, and a chain 235 trained thereover.

The cams are driven at the same speed, and are related so that when upper cam 205 accomplishes its full downward travel, lower cam 214 accomplishes its full forward travel.

*Operation.*—Suitable refrigerant is first circulated through the cooling pans 55 and 72 to chill the moving conveyor belts 24 and 63, respectively.

Molten cheese is then supplied the gear pump 20 which forces the fluid cheese into the nozzle 23 from which it flows through the outlet defined by the nozzle and cooperating conveyor belt 24, and onto said belt, thereby forming a thin sheet of cheese 30 on said belt.

As the cheese is conveyed toward the end of the conveyor it is chilled sufficiently so as to no longer adhere tightly to the belt. As the cheese sheet progresses around the end drum 46 it is transferred therefrom and is directed onto the underlying conveyor belt 63, and deposited thereon, invertedly, so that the top side of the cheese sheet, as formed, is now the underside disposed against the chilled belt surface 63.

As the cheese sheet is conveyed toward the end of the second conveyor it is further chilled to completion; the chilling having been effected from both sides of the sheet due to the inverting of the sheet at the transfer to the second conveyor belt.

The dwell of the cheese on the first conveyor belt allows the fluid cheese to set-up or gel, and results in the development of a smooth-finished surface on the under or belt-reposing side. A similar surface is developed on the remaining side of the cheese sheet when it is inverted on the underlying second belt.

The developed sealed surfaces on both sides of the cheese sheet, retard drying and loss of flavor, and are relatively non-cohesive so that the cheese leaves can be easily separated when removed from the package by the consumer.

The cheese sheet then progresses to the slitters 101 where the sheet is cut into ribbons. The blades are fixed, and the cheese is cut by the action of the cheese sheet passing over the slitter drum 95 and under the knife blades. Because the blades are very thin and sharp a fine cutting line is produced, and the sheet is neatly cut into ribbons. Care should be taken to have the cheese sufficiently cooled at this point so that the ribbons' edges do not adhere to one another after passing the blades.

From the slitters, the cheese ribbons are directed onto the stacking or superimposing conveyors, which stack the ribbons in a predetermined order upon the belt of the transfer conveyor 110.

The transfer conveyor delivers the stacked ribbons to the cutter 177 which severs the elongated stack into sections of suitable consumer length.

From the cutter the cheese sections are delivered to the separating conveyor 184, which because of its more rapid travel relative to the transfer conveyor, results in the cheese sections being suitably spaced, for convenient handling, on said separating conveyor. The sections then proceed to any suitable wrapping stations or other apparatus, as desired.

The passage of the cheese through the cutter must be continuous so as not to interrupt the operational flow of the cheese being formed and processed. As a consequence thereof the knife blade must be made to move with the cheese, as it accomplishes its cutting function.

Assuming the cutter blade 195 disposition as shown in Fig. 1c, it will be noted that the knife edge has cut through to its maximum position and severed a section from the oncoming ribbon stack.

Consistent therewith, it will be noted that the downward actuating cam 205 and the forward actuating cam 214 are at their full downward and full forward points of travel, respectively. A further rotation of cam 205, and the drop-off portion of said cam will be reached whereby the knife blade will be quickly returned to its raised retracted position ready for a repeated cutting action.

During the raised retracted positionment of the blade, the cheese stack will travel a predetermined distance beyond the blade, and the cam 205 will have rotated through a sufficient cam angle to bring the cam lobe into position whereby to commence another downward stroke of the knife, for another severance.

Also, when the cam 205 reaches its point of beginning of downward travel, the associated cam 214 commences its forward travel, to keep the blade moving with the cheese during the cutting stroke of the blade.

For practicable results, the throw of cam 205 is 1.125 inches and the throw of cam 214 is 0.8125 inch.

The characteristic features of this invention are the provision of a suitable nozzle and cooperating moving belt for flowing and forming a thin sheet of cheese thereon; the provision of flat belt means for chilling sheet cheese; the provision of a first conveyor, and a second underlying conveyor traveling in the opposite direction for inverting the cheese sheet on the second conveyor as it is transferred to said second conveyor; the provision of a plurality of superposing conveyors for stacking ribbons onto a transfer conveyor relatable from 0° to 90° to the cheese casting equipment; and the provision of guillotine cutter means adapted to cut moving stacked cheese into sections having sheer vertical-cut ends.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. In a cheese forming apparatus, a supporting surface; and a nozzle, an open end thereof disposed against said surface and defining an outlet therewith for forming a cheese sheet on said surface, said nozzle having a fixed V-shaped knife edge at the discharge end thereof, the underside of said V-shaped knife edge being substantially parallel to said supporting surface and spaced from said supporting surface a predetermined distance.

2. The apparatus of claim 1 wherein the V-shaped knife edge is substantially a 60° V-shaped knife edge.

3. In a cheese forming apparatus, a supporting surface; and a nozzle, an open end thereof disposed against said surface, said nozzle having a fixed projecting upper lip portion disposed at an acute angle relative to said supporting surface, and said lip portion having a V-shaped knife edge at the leading edge thereof, the underside of said V-shaped knife edge being substantially parallel to said supporting surface and spaced from said supporting surface a predetermined distance.

References Cited in the file of this patent

UNITED STATES PATENTS

| | | |
|---|---|---|
| 573,928 | Stevens et al. | Dec. 29, 1896 |
| 846,716 | Ashelm | Mar. 12, 1907 |
| 864,028 | Peters | Aug. 20, 1907 |
| 1,837,854 | Esselen | Dec. 22, 1931 |
| 2,016,612 | Nilsson | Oct. 8, 1935 |
| 2,045,328 | Levey | June 23, 1936 |
| 2,103,545 | Miollis | Dec. 28, 1937 |
| 2,313,125 | Czapek | Mar. 9, 1943 |
| 2,352,210 | Kraft | June 27, 1944 |
| 2,361,775 | Kraft | Oct. 31, 1944 |
| 2,439,840 | Buroff | Apr. 20, 1948 |
| 2,481,162 | Seely | Sept. 6, 1949 |
| 2,665,450 | Lindquist | Jan. 12, 1954 |